United States Patent [19]
Wu

[11] Patent Number: 5,332,095
[45] Date of Patent: Jul. 26, 1994

[54] BAG WITH MEANS FOR VACUUMING AN INTERNAL SPACE THEREOF

[76] Inventor: Hans Wu, 2F, No.2, Alley 97, Lane 226, Sec.3, Tung-Men Rd., Tainan City, Taiwan

[21] Appl. No.: 147,141

[22] Filed: Nov. 2, 1993

[51] Int. Cl.⁵ .............................................. B65D 81/20
[52] U.S. Cl. ................................ 206/524.8; 383/103; 383/904; 137/859
[58] Field of Search ................. 206/524.8, 522; 383/3, 383/41, 100, 103, 904; 137/852, 859, 854

[56] References Cited

U.S. PATENT DOCUMENTS

| | | | |
|---|---|---|---|
| 3,958,693 | 5/1976 | Greene | 206/524.8 X |
| 3,980,226 | 9/1976 | Franz | 206/524.8 |
| 5,080,155 | 1/1992 | Crozier | 206/524.8 X |
| 5,142,970 | 9/1992 | Erhenbrack | 206/524.8 X |

Primary Examiner—Jacob K. Ackun, Jr.
Attorney, Agent, or Firm—Willian Brinks Hofer Gilson & Lione

[57] ABSTRACT

An air impermeable bag is provided with a vacuuming unit for vacuuming an internal space of the bag after the latter is hermetically sealed. The vacuuming unit includes a check valve, the position of which is not altered during and after a pumping operation to vacuum the internal space of the bag.

7 Claims, 6 Drawing Sheets

BAG WITH MEANS FOR VACUUMING AN INTERNAL SPACE THEREOF

FIELD OF THE INVENTION

1. Background of the Invention

This invention relates to a bag, more particularly to a bag with means for vacuuming an internal space of the bag.

2. Description of the Related Art

In order to keep food fresh and edible, food is generally packed and heat-sealed in an air impermeable bag so that moisture can not seep thereinto.

It is known that the storage life of food can prolong if the space in which the food is placed is substantially vacuum. Presently, a conventional bag which has means for prolonging the storage life of food kept within the same by vacuuming an internal space of the bag is already available in the market.

As best illustrated in FIGS. 1 and 2, the conventional bag includes an air impermeable plastic bag body 11 with an open end 111 and confines an internal space 110 for receiving things therein. The plastic bag body 11 has an opening 112 formed therethrough which communicates the internal space 110 and an exterior of the bag body 11. A circular base seat 12, which is preferably made of plastic, has a periphery that is heat-sealed along the periphery of the opening 112 so as to cover the same. The base seat 12 has a plurality of vent-holes 121 formed compactly therethrough. A circular positioning seat 13 is fixed on the base seat 12 and has a central opening 132. An internally threaded tube 131 extends axially and outwardly from the periphery of the central opening 132 of the circular positioning seat 13. A washer ring 16 is sleeved around the internally threaded tube 131 of the positioning seat 13 to facilitate compression purposes. A rubber check valve 14 is inserted movably into the internally threaded tube 131 of the positioning seat 13. A triangular pressing plate 15 has a through-hole 151 and an externally threaded tube 152 which extends from the periphery of the through-hole 151 and which is threaded into the internally threaded tube 131 of the positioning seat 13. Under this condition, a free end 153 of the externally threaded tube 152 of the pressing plate 15 compresses the rubber check valve 14 to close hermetically the central opening 132 of the positioning seat 13, thereby blocking the passage of air from and into the internal space 110 of the bag body 11. A plug member 17, usually made of rubber, is squeezed into the through-hole 151 of the pressing plate 15.

In use, food is placed in the plastic bag body 11 and the open end 111 of the bag body 11 is heat-sealed so that the internal space 110 of the same is closed hermetically. In order to make the internal space 110 of the bag body 11 substantially vacuum, the plug member 17 is removed from the pressing plate 15, and the pressing plate 15 is loosened from the positioning seat 13 in order to permit movement of the rubber check valve 14 between the positioning seat 13 and the free end 153 of the externally threaded tube 152 of the pressing plate 15.

A vacuum pump (not shown) is placed on the pressing plate 15 and is operated so that air within the internal space 110 of the plastic bag body 11 is suctioned and expelled to the exterior of the bag body 11 via the vent-outlets 121 of the base plate 12, the central opening 132 of the positioning seat 13, and the through-hole 151 of the pressing plate 15. When the internal space 110 of the plastic bag body 11 is substantially vacuum, the pump is removed from the pressing plate 15. The rubber check valve 14 is suctioned so as to close hermetically the through-hole 151 of the pressing plate 15 due to a difference in pressure within the internal space 110 and the exterior of the bag body 11. The pressing plate 15 is tightened so as to compress the rubber check valve 14, thereby closing the central opening 132 of the positioning seat 13 and preventing air from letting into the internal space 110.

Some of the drawbacks resulting from the use of the conventional bag shown in FIGS. 1 and 2 are as follows:

(1) During and after the pumping operation, the rubber check valve 14 may be misplaced from its proper position because it is provided in the internally threaded tube 131 of the positioning seat 13 without a proper guiding means.

(2) Since the check valve 14 used in the conventional bag is a plug type, the check valve 14 is relatively thick and can not be deformed easily to compensate for the misplacement thereof.

(3) In order to compensate for the misplacement of the check valve 14, the conventional bag is provided with the pressing plate 15 which can be turned to compress the check valve 14 toward the proper position so as to close the through-hole 132 of the positioning seat 13. However, this requires additional manufacturing costs when producing the conventional bag.

SUMMARY OF THE INVENTION

Therefore, a main objective of the present invention is to provide a bag with means for vacuuming an internal space thereof and which is free from the above-mentioned drawbacks.

Accordingly, the bag of the present invention includes an air impermeable bag body that has an open end and that confines an internal space therein. The bag body has an opening formed therethrough to communicate the internal space and the exterior of the same. A fixing seat is secured to the periphery of the opening in the bag body and has a through-hole formed therethrough. A check valve, which is made of a flexible material, is disposed on the fixing seat and includes a covering unit which covers hermetically the through-hole of the fixing seat. A bowl-shaped cover member includes an annular seating flange which is provided on the fixing seat and which encloses the covering unit of the check valve. The bowl-shaped cover member further has a flat plate which is spaced from and parallel to the covering unit, and defines a space between the covering unit and the flat plate. The flat plate of the bowl-shaped cover member has at least one passage hole to communicate the space with the exterior of the bag body.

The fixing seat has a plurality of abutting rods which extend into the internal space of the bag body from one face thereof and a plurality of engaging rods which extend from an opposite face thereof.

In one embodiment, the covering unit is a circular disc and the check valve further includes an annular positioning lid with an inner periphery which defines a central opening to receive the circular disc, and two opposed connecting ribs extending inwardly and radially from the inner periphery so as to interconnect the circular disc and the annular positioning lid. The annular positioning lid further includes a plurality of engaging holes into which the engaging rods of the fixing seat extend, thereby mounting the check valve on the fixing seat. To complement the check valve, the bowl-shaped cover member further includes a pressing protrusion which is formed adjacent to the seating flange and which projects in a direction away from the flat plate of the same. A pressing plate is provided preferably on the annular positioning lid and is compressed by the pressing protrusion of the bowl-shaped cover member, thereby retaining securely the annular positioning lid on the fixing seat. During the pumping operation of air from the internal space of the bag body, the circular disc of the check valve moves resiliently away from the fixing seat so as to uncover the through-hole of the latter to permit the release of air in the bag via the through-hole.

In another embodiment, the fixing seat has a plurality of vent-outlets formed around the through-hole of the fixing seat. The covering unit of the check valve is also a circular disc and has an engaging plug extending centrally therefrom and being engaged securely which the through-hole of the fixing seat. Under such a condition, the circular disc covers hermetically the vent-outlets of the fixing seat. During the pumping operation of air from the internal space of the bag body, the suction force causes a portion of the circular disc around the engaging plug to discontact partially the fixing seat so as to uncover the vent-outlets. The air escapes to the exterior of the bag body via the vent-outlets of the fixing seat.

The check valve employed in the present invention is mounted securely on the fixing seat so that during and after the pumping operation of air from the bag body, the position of the check valve is not changed and therefore displacement thereof relative to the through-hole of the fixing seat can be avoided. Since the check valve has a diaphragm-type construction which can provide an effective sealing effect.

In addition, the bag of the present invention does not include a triangular pressing plate as required in the conventional bag. This can result in convenience to the user of the bag of the present invention since the working steps that are associated with the triangular pressing plate of the prior art are obviated.

Since fewer elements are needed to construct the vacuuming means of the bag, the manufacturing process for the bag of the present invention is correspondingly simplified.

BRIEF DESCRIPTION OF THE DRAWINGS

Other features and advantages of the present invention will become more apparent in the following detailed description of the preferred embodiments with reference to the accompanying drawings, in which.

DETAILED DESCRIPTION OF THE PREFERRED EMBODIMENTS

Figure 1:
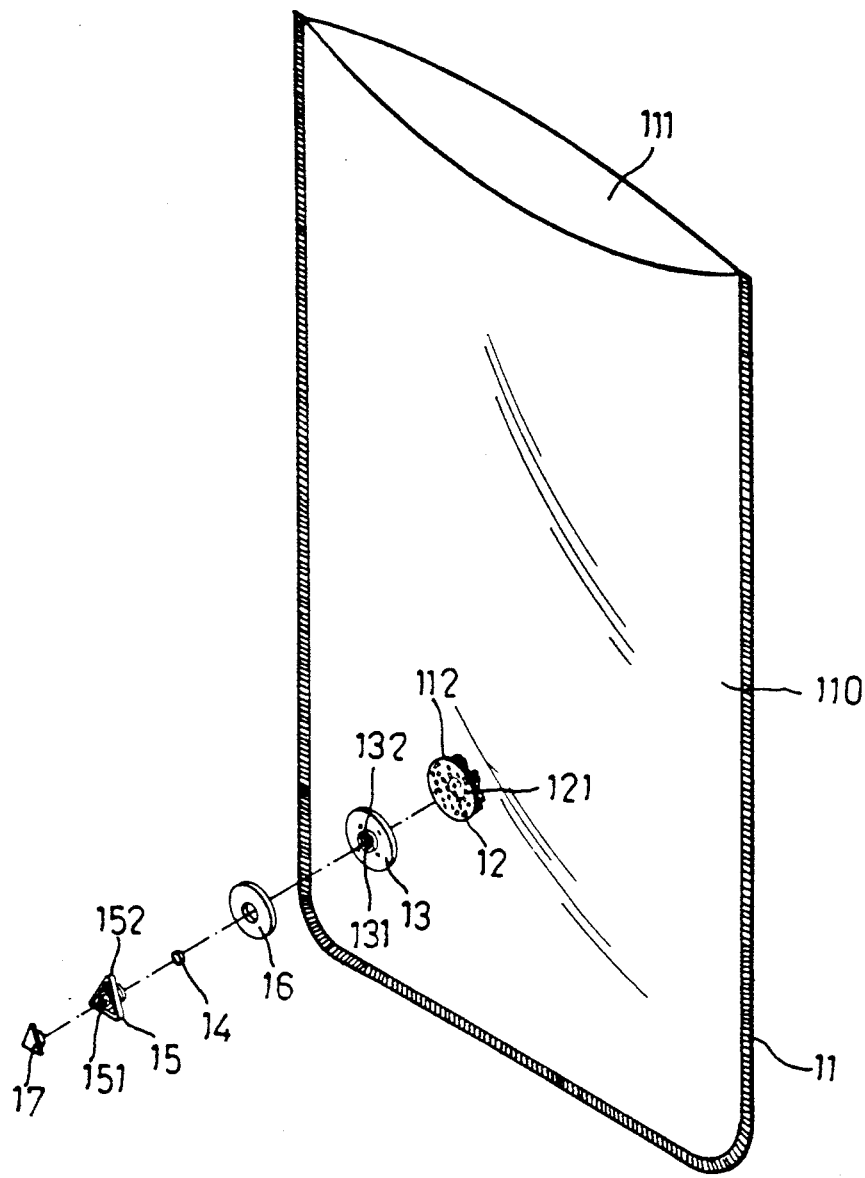
FIG. 1 shows a partially exploded view of a conventional bag with means for vacuuming an internal space thereof.
Figure 2:
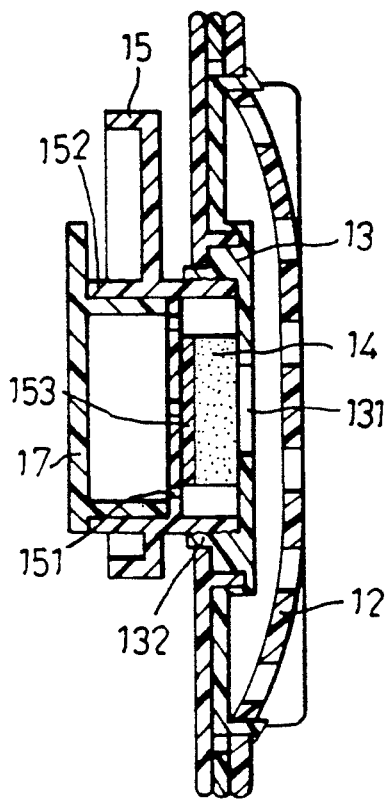
FIG. 2 shows a cross sectional view of vacuuming means employed in the conventional bag.
Figure 3:
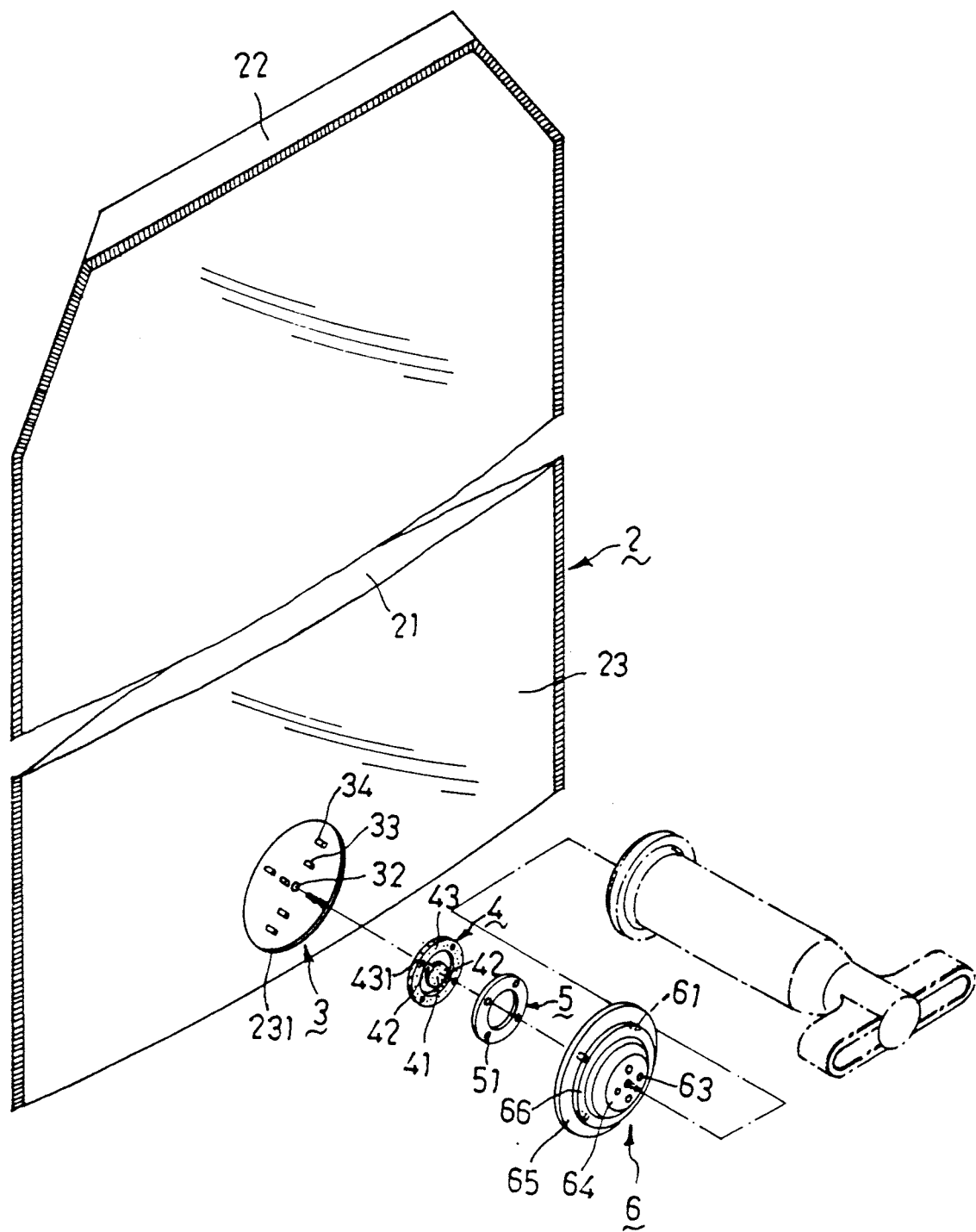
FIG. 3 shows a first preferred embodiment of a bag with means for vacuuming its internal space according to the present invention.
Figure 4:
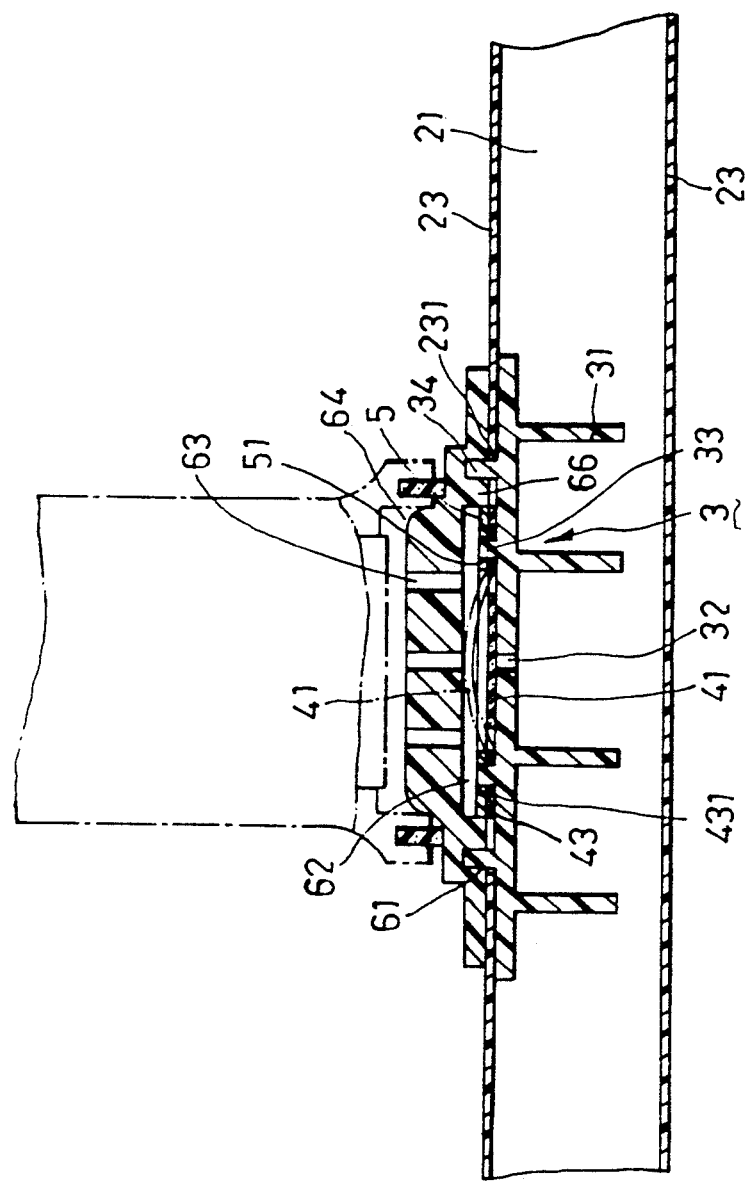
FIG. 4 illustrates how the internal space of the bag of the present invention is vacuumed partially with the use of a pump.

Referring to FIGS. 3 and 4, a bag according to the present invention includes an air impermeable bag body 2, which is generally made of a metal foil or plastic, that has an open end 22 and an opening 231 formed therethrough. The bag body 2 confines an internal space 21 to receive things therein.

The periphery of a circular fixing seat 3 is fixed to the periphery of the opening 231 in the bag body 2, thereby covering the latter. The fixing seat 3 has a central through-hole 32, a plurality of abutting rods 31 which extend from one face thereof and into the internal space 21 so as to prevent the two sides of the bag body 11 from sticking together during a vacuuming operation, a circle of first engaging rods 34 formed adjacent to and along the periphery of the fixing seat 3, and a circle of second engaging rods 33 located between the first engaging rods 33 and the through-hole 32 on the opposite face of the fixing seat 3.

A check valve 4, which is made of rubber, includes an annular positioning lid 43 that has a plurality of engaging holes 431 formed therethrough, an inner periphery that confines a central opening to receive a thin covering unit comprising a covering circular disc 41 and two opposed connecting ribs 42 that extend radially and inwardly from the inner periphery to interconnect the positioning lid 43 and the circular disc 41. When the check valve 4 is mounted on the fixing seat 3, the second engaging rods 33 engage the engaging holes 431 of the positioning lid 43, while the covering disc 41 covers hermetically the through-hole 32 of the fixing seat 3.

A pressing plate 5 is mounted securely on the fixing seat 3 and is formed with a plurality of engaging holes 51. The second engaging rods 33 of the fixing seat 3 further engage the engaging holes 51 of the pressing plate 5.

A bowl-shaped cover member 6 is mounted on the fixing seat 3. The cover member 6 has an annular seating flange 65 with a plurality of engaging recesses 61, and a flat plate 64 which is spaced from the seating flange 65 and which is formed with a plurality of passage holes 63. The bowl-shaped cover member 6 further includes a pressing protrusion 66 which is formed adjacent to the seating flange 65 and which projects in a direction away from the flat plate 64. The protrusion 66 presses the pressing plate 5, thereby securing the annular positioning lid 43 of the check valve 4 to prevent its disengagement from the fixing seat 3. The first engaging rods 34 of the fixing seat 3 are engaged within the engaging recesses 61, while the flat plate 64 of the cover member 6 is spaced from the pressing plate 5 and parallel to the same.

Figure 5:
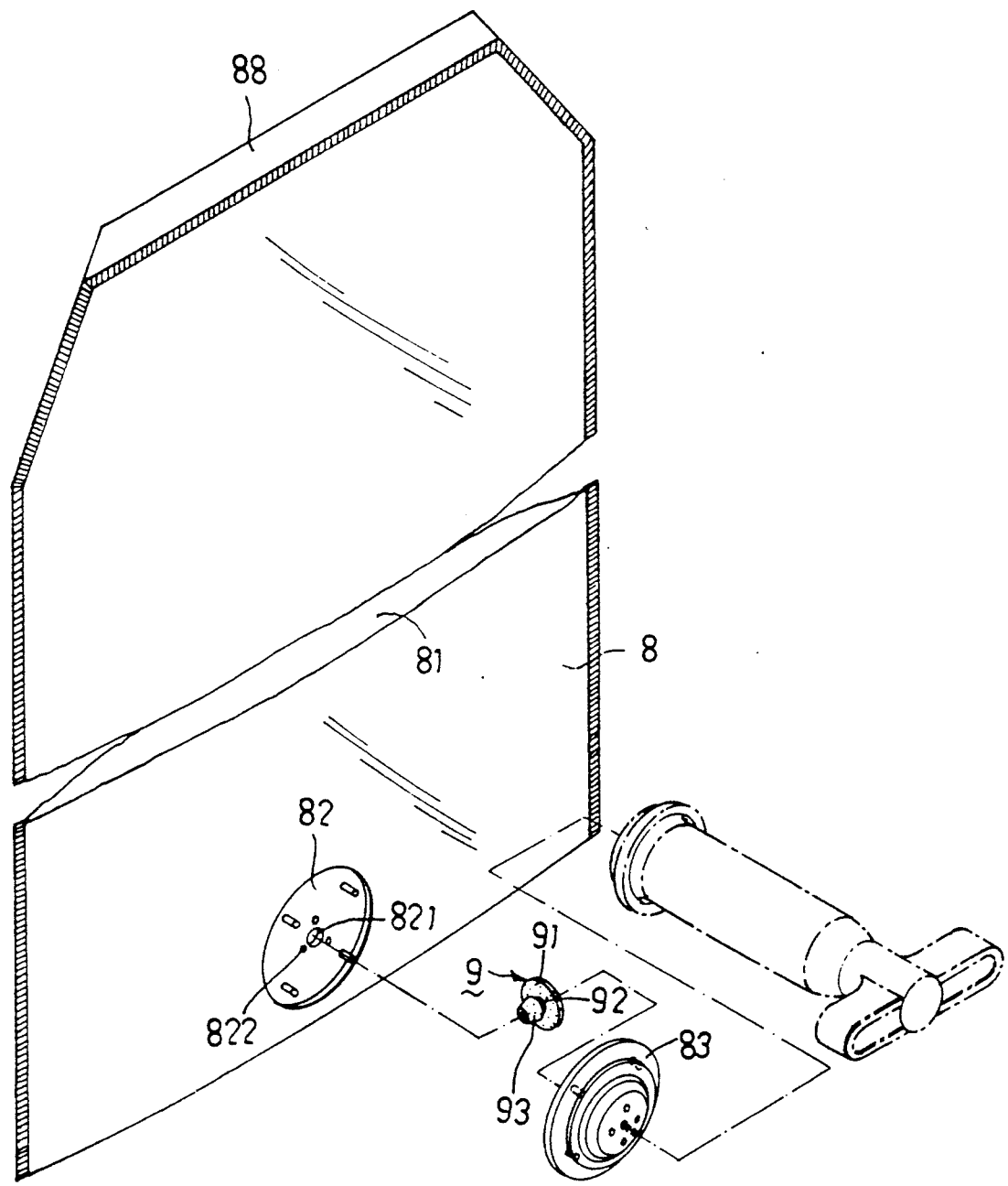
FIG. 5 shows a second preferred embodiment of the bag with means for vacuuming its internal space according to the present invention.
Figure 6:
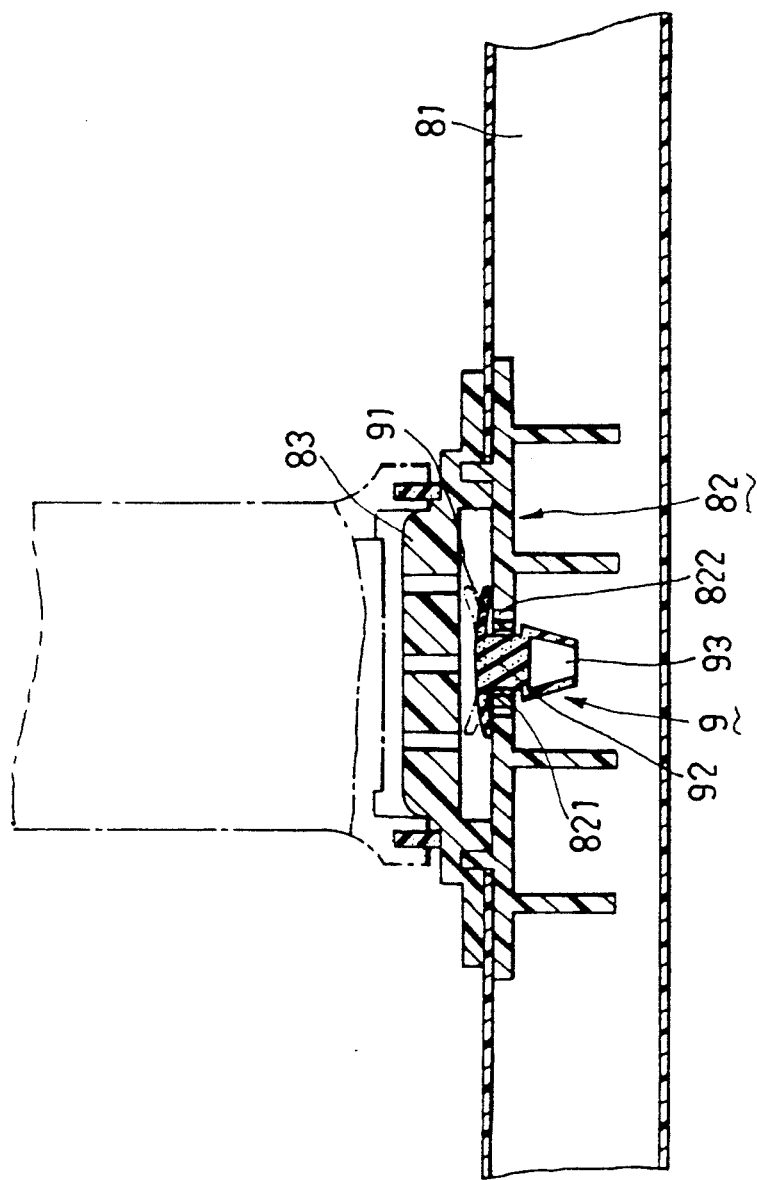
FIG. 6 illustrates how the internal space of the second preferred embodiment of the bag is vacuumed partially with the use of a pump.

Referring to FIGS. 5 and 6, in another preferred embodiment, the construction of the fixing seat 82 and the bowl-shaped cover member 83 are similar those of to the previous embodiment, except that the fixing seat 82 has a plurality of vent-outlets 822 formed around the through-hole 821. The check valve 9 in this embodiment includes a thin rubber circular disc 91 and an engaging plug 93 which extends centrally from the circular disc 91 and which has an annular groove 92 formed adjacent to the same. The fixing seat 82 has an inner periphery which confines the through-hole 821 and engages the annular groove 92 of the engaging plug 93 of the check valve 9 while the circular disc 91 covers the vent-outlets 822. The bowl-shaped cover member 83 is mounted on the fixing seat 82 in a manner similar to the previous embodiment.

In use, food is placed in the internal space 21, 81 of the bag body 2, 8, and the open end 22, 88 of the bag body 2, 8 same is heat-sealed. In order to prolong the storage life of food placed in the bag body 2, 8, some of the air in the bag body 2, 8 is pumped out. This is done with the use of a vacuuming apparatus or a pump, as shown in FIGS. 4 and 6. In the first embodiment, the circular covering disc 41 moves resiliently away from the fixing seat 3 due to the application of a compression force on the pressing plate 5 so as to expose the through-hole 32 of the fixing seat 5, thereby permitting the escape of air to the exterior of the bag body 2 via the through-hole 32 of the fixing seat 3 and the passage holes 63 of the flat plate 64 of the bowl-shaped cover member 6. When the pumping operation is terminated, the circular covering disc 41 covers the through-hole 32 of the fixing seat 3 due to the presence of a difference in pressures of the bag body 2 and the exterior of the same and due to the restoration force of the rubber material from which the check valve 4 is made.

In the second embodiment, since the engaging plug 93 of the check valve 9 is connected securely to the fixing seat 82, only a portion of the circular disc 91 which is a covering unit around the engaging plug 93 moves relative to the fixing seat 82 during the pumping operation, as shown by the dotted lines in FIG. 6, thereby exposing the vent-outlets 822 to permit the escape of the air from the bag body 8. When the pumping operation is ceased, the circular disc 91 of the check valve 9 covers hermetically the vent-outlets 822 of the fixing seat 82 due to a difference in the pressures of the internal space 81 of the bag body 8 and the exterior thereof.

From the above description, it can be clearly shown that during and after the pumping operation, the position of the check valve is not altered, so that misplacement of the check valve does not occur, thereby resulting in a better sealing effect to the through-hole of the fixing seat. No extra steps are required, such as loosening of the pressing plates to permit the movement of the check valve, thereby facilitating the operator. In addition, fewer elements are needed to construct the vacuuming means of the bag of the present invention. Therefore, the manufacturing cost can be reduced accordingly.

While preferred embodiments have been explained and described, it will be apparent that many changes and modifications can be made in the general construction and arrangement of the present invention without departing from the scope and spirit thereof. Therefore, it is desired that the present invention be not limited to the exact disclosure but only to the extent of the appended claims.

I claim:

1. A bag with means for vacuuming an internal space thereof, said bag comprising:
   an air impermeable bag body confining said internal space for receiving things therein and having an opening formed therethrough for communicating an exterior of said bag body and said internal space;
   a fixing seat which is secured to said bag body and which covers a periphery of said opening, said fixing seat having a through-hole formed therethrough and communicated with said internal space;
   a check valve made of flexible material and comprising a first portion substantially fixedly mounted on said fixing seat, said check valve including a covering unit, said covering unit comprising a second portion of said check valve movably mounted with respect to said first portion of said check valve, wherein said covering unit is movable between a first position that covers hermetically said through-hole of said fixing seat when pressure within said internal space is lower than that at the exterior of said bag body, thereby preventing air from entering into said internal space via said through-hole, and a second position wherein said through-hole is uncovered for permitting air within said internal space to be released through the exterior of said bag body through said through-hole; and
   a bowl-shaped cover member enclosing hermetically said check valve and having a flat plate which is spaced and parallel to said covering unit so as to define a space between said flat plate and said covering unit, said flat plate having at least one passage hole formed therethrough.

2. The bag as defined in claim 1, wherein said check valve further includes an annular positioning lid which has an inner periphery that defines a central opening therein, said covering unit being a circular disc and being disposed in said central opening, said annular positioning lid further having a plurality of engaging holes formed therethrough and two connecting ribs extending radially and inwardly from said inner periphery to interconnect said circular disc and said annular positioning lid.

3. The bag as defined in claim 2, wherein said fixing seat has two opposed faces, a plurality of first abutting rods extending into said internal space from one of said opposed faces, a circle of first engaging rods formed adjacent to and along a periphery of said fixing seat on the other one of said opposed faces, and a circle of second engaging rods formed around said through-hole on said other one of said opposed faces, said circle of second engaging rods being formed between said through-hole and said circle of first engaging rods, said second engaging rods being engaged within said engaging holes of said annular positioning lid to fix said check valve on said fixing seat.

4. The bag as defined in claim 3, wherein said bowl-shaped cover member further includes a first seating flange formed therearound, a plurality of first engaging recesses which are formed in said seating flange and which receive engageably said first engaging rods of said fixing seat, and a pressing protrusion which is formed between adjacent to said seating flange and which projects in a direction away from said flat plate to compress said annular positioning lid so as to secure said positioning lid on said fixing seat.

5. The bag as defined in claim 1, wherein said fixing seat has a plurality of vent-outlets formed around said through-hole, said covering unit including a covering disc which has an engaging plug projecting centrally from said covering disc, said engaging plug having an annular groove located adjacent to said covering disc, said fixing seat having an inner periphery which confines said through-hole and extending into said annular groove of said engaging plug so as to prevent said covering disc from disengaging said fixing seat, thereby covering said vent-outlets of said fixing seat.

6. The bag as defined in claim 5, wherein said fixing seat has two opposed faces, a plurality of second abutting rods projecting into said internal space of said bag body from one of said opposed faces, and a plurality of third engaging rods projecting outwardly therefrom.

7. The bag as defined in claim 6, wherein said bowl-shaped cover member further includes a second seating flange which is formed therearound and which has a plurality of second engaging recesses to receive said plurality of third engaging rods, thereby fixing said bowl-shaped cover member on said fixing seat.

* * * * *